United States Patent
Wang

(10) Patent No.: US 10,969,634 B2
(45) Date of Patent: Apr. 6, 2021

(54) LIQUID CRYSTAL DISPLAY PANEL, LIQUID CRYSTAL DISPLAY DEVICE AND METHOD OF CONTROLLING GRAY SCALE OF LIQUID CRYSTAL DISPLAY DEVICE

(71) Applicant: BOE TECHNOLOGY GROUP CO., LTD., Beijing (CN)

(72) Inventor: Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/608,413

(22) PCT Filed: Mar. 22, 2019

(86) PCT No.: PCT/CN2019/079221
§ 371 (c)(1),
(2) Date: Oct. 25, 2019

(87) PCT Pub. No.: WO2019/184810
PCT Pub. Date: Oct. 3, 2019

(65) Prior Publication Data
US 2020/0081303 A1    Mar. 12, 2020

(30) Foreign Application Priority Data
Mar. 28, 2018  (CN) .......................... 201810264445.9

(51) Int. Cl.
*G02F 1/1343*   (2006.01)
*G02F 1/1335*   (2006.01)
(Continued)

(52) U.S. Cl.
CPC ...... *G02F 1/134309* (2013.01); *G02F 1/1335* (2013.01); *G02F 1/1339* (2013.01);
(Continued)

(58) Field of Classification Search
CPC ............. G02F 1/134309; G02F 1/1335; G02F 1/133512; G02F 1/1339; G02F 1/133514;
(Continued)

(56) References Cited

U.S. PATENT DOCUMENTS 8,390,753 B2 * 3/2013 Choi ................. G02F 1/136209
349/106
2004/0041965 A1   3/2004 Liu
(Continued)

FOREIGN PATENT DOCUMENTS

CN    102253563 A    11/2011
CN    102282504 A    12/2011
(Continued)

OTHER PUBLICATIONS

First Office Action for Chinese Application No. 201810264445.9, dated Feb. 3, 2020, 5 Pages.
(Continued)

*Primary Examiner* — Charles S Chang
(74) *Attorney, Agent, or Firm* — Brooks Kushman P.C.

(57) ABSTRACT

A liquid crystal display panel, a liquid crystal display device and a method of controlling a gray scale of a liquid crystal display device are provided. The display panel includes first and second substrates, and a liquid crystal layer between the first and second substrates, wherein the second substrate is at a light-emitting side of the liquid crystal layer. The display panel further includes a first transparent electrode and a second transparent electrode, which are between the first and second substrates and arranged at two sides of the liquid crystal layer respectively, wherein at least one of the transparent electrodes includes a plurality of sub-electrodes parallel to each other and each extending in a straight line. The display panel also includes a refraction layer between the crystal layer and the second substrate, the refraction layer
(Continued)

having a refractive index less than a refractive index of the liquid crystal layer.

13 Claims, 3 Drawing Sheets

(51) Int. Cl.
*G02F 1/1339* (2006.01)
*G02F 1/13357* (2006.01)

(52) U.S. Cl.
CPC .. *G02F 1/133512* (2013.01); *G02F 1/133514* (2013.01); *G02F 1/133617* (2013.01); *G02F 2001/133562* (2013.01); *G02F 2001/133565* (2013.01); *G02F 2001/134318* (2013.01); *G02F 2001/134345* (2013.01); *G02F 2203/30* (2013.01)

(58) Field of Classification Search
CPC ... G02F 1/133617; G02F 2001/133562; G02F 2001/133565; G02F 2001/134318; G02F 2001/134345; G02F 2203/30
USPC .................................................... 349/95, 104
See application file for complete search history.

(56) References Cited

U.S. PATENT DOCUMENTS

| | | |
|---|---|---|
| 2011/0304528 A1 | 12/2011 | Murata et al. |
| 2018/0046026 A1 | 2/2018 | Wang et al. |
| 2018/0046059 A1 | 2/2018 | Yang et al. |
| 2019/0155094 A1* | 5/2019 | Kim ...................... G02F 1/1368 |
| 2019/0265521 A1 | 8/2019 | Liang et al. |
| 2020/0081303 A1 | 3/2020 | Wang |

FOREIGN PATENT DOCUMENTS

| | | | |
|---|---|---|---|
| CN | 103176308 A | | 6/2013 |
| CN | 105549266 A | | 5/2016 |
| CN | 105629491 | * | 6/2016 ............ G02B 27/22 |
| CN | 105652490 A | | 6/2016 |
| CN | 106569365 A | | 4/2017 |
| CN | 108427225 A | | 8/2018 |
| KR | 20110078723 A | | 7/2011 |
| KR | 20120045968 A | | 5/2012 |

OTHER PUBLICATIONS

International Search Report and Written Opinion for Application No. PCT/CN2019/079221, dated Jun. 24, 2019, 11 Pages.

* cited by examiner

LIQUID CRYSTAL DISPLAY PANEL, LIQUID CRYSTAL DISPLAY DEVICE AND METHOD OF CONTROLLING GRAY SCALE OF LIQUID CRYSTAL DISPLAY DEVICE

CROSS-REFERENCE TO RELATED APPLICATIONS

This application is the U.S. national phase of PCT Application No. PCT/CN2019/079221 filed on Mar. 22, 2019, which claims priority to Chinese patent application No. 201810264445.9 filed on Mar. 28, 2018, which are incorporated herein by reference in their entireties.

TECHNICAL FIELD

The present disclosure relates to the field of display technology, in particular to a liquid crystal display panel, a liquid crystal display device and a method of controlling a gray scale of the liquid crystal display device.

BACKGROUND

In the related art, a liquid crystal display includes a liquid crystal display panel, a backlight and polarizers attached to a light-emitting side and a light-entering side of the liquid crystal display panel. The liquid crystal display panel includes a color film substrate, an array substrate and a liquid crystal layer between the color film substrate and the array substrate. Since transmittance ratios of the color filter substrate, the array substrate and the polarizers cannot reach 100%, light energy emitted from the backlight may be lost greatly, and finally the transmittance ratio of the liquid crystal display may only reach about 5%, resulting in the low transmittance ratio, high energy consumption and low energy utilization. In addition, the liquid crystal display is also provided with a grid-like black matrix. The black matrix not only absorbs light energy but also affects a transparency of the liquid crystal display, so that the liquid crystal display cannot be used for transparent display.

SUMMARY

A liquid crystal display panel, including: a first substrate, a second substrate, and a liquid crystal layer between the first substrate and the second substrate, where the second substrate is at a light-emitting side of the liquid crystal layer, the liquid crystal display panel further includes:

a first transparent electrode and a second transparent electrode, which are between the first substrate and the second substrate and arranged at two sides of the liquid crystal layer respectively, where at least one of the first transparent electrode and the second transparent electrode includes a plurality of sub-electrodes parallel to each other and extending in straight lines, the first transparent electrode and the second transparent electrode are configured to deflect liquid crystal molecules in regions corresponding to the sub-electrodes in the liquid crystal layer to form a plurality of microprism structures in the case that a voltage is applied to the first transparent electrode and the second transparent electrode; and a refraction layer, between the crystal layer and the second substrate, wherein the refraction layer has a refractive index less than a refractive index of the liquid crystal layer.

Optionally, the liquid crystal display panel further includes:

a black matrix, between the first substrate and the second substrate, at an edge of the liquid crystal display panel and surrounding the liquid crystal layer.

Optionally, a cross section of the black matrix in a direction perpendicular to the first substrate is a trapezoidal cross section.

Optionally, two base angles of the trapezoidal cross section range from 45° to 80°.

Optionally, the refractive index of the refractive layer is less than 1.2.

Optionally, the liquid crystal display panel further includes:

a filter layer, at a side of the liquid crystal layer away from the first substrate, wherein the filter layer is configured to convert light transmitting through the liquid crystal layer and corresponding to each of the microprism structures into light having at least one color.

Optionally, the filter layer is made of a quantum dot material.

Optionally, the first transparent electrode and the second transparent electrode are configured to deflect the liquid crystal molecules in regions corresponding to the sub-electrodes in the liquid crystal layer to form a plurality of triangular prism structures and/or quadrilateral prism structures in the case that the voltage is applied to the first transparent electrode and the second transparent electrode.

Optionally, the filter layer is at a side of the refractive layer away from the liquid crystal layer, and the second transparent electrode is at a side of the refractive layer close to the liquid crystal layer.

Optionally, the first transparent electrode includes the sub-electrodes parallel to each other and extending in the straight lines, and the second transparent electrode is a planar electrode.

Optionally, the second transparent electrode includes the sub-electrodes parallel to each other and extending in the straight lines, and the first transparent electrode is a planar electrode.

Optionally, an orthographic projection of the black matrix onto the first substrate overlaps with an orthographic projection of the sub-electrodes at the edge of the liquid crystal display panel onto the first substrate.

A liquid crystal display device is further provided in the present disclosure, including the liquid crystal display panel hereinabove and further including a backlight at a light-entering side of the liquid crystal display panel and configured to emit collimated light or parallel light.

A method of controlling a gray scale of a liquid crystal display device hereinabove is further provided in the present disclosure, including:

applying a voltage to the first transparent electrode and the second transparent electrode according to image data, in the case that the liquid crystal display device displays, to deflect the liquid crystal molecules in the regions corresponding to the sub-electrodes in the liquid crystal layer to form the microprism structures; controlling the microprism structures by adjusting the voltage applied to the sub-electrodes, to control a distribution ratio of emitting light of the backlight being refracted through the microprism structures within a predetermined viewing angle range.

BRIEF DESCRIPTION OF THE DRAWINGS

FIG. 3b is a top view of the sub-electrode 33 in the liquid crystal display panel of FIG. 3a;

DETAILED DESCRIPTION

In order to make the technical issues, technical solutions and advantages of the embodiments of the present disclosure more clear, the technical solutions of the embodiments of the present disclosure will be clearly and completely described below in conjunction with the drawings of the embodiments of the present disclosure.

Figure 1:
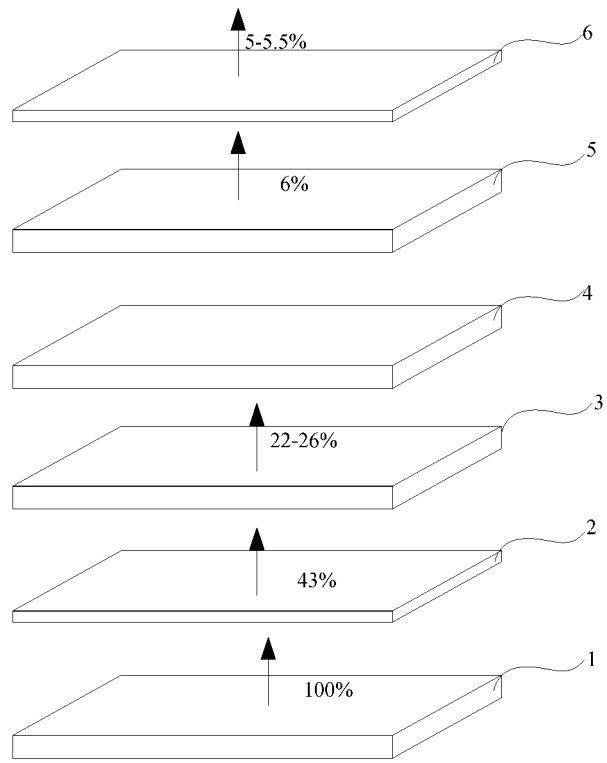
FIG. 1 and FIG. 2 are structural schematic diagrams of a liquid crystal display in the related art.
Figure 2:
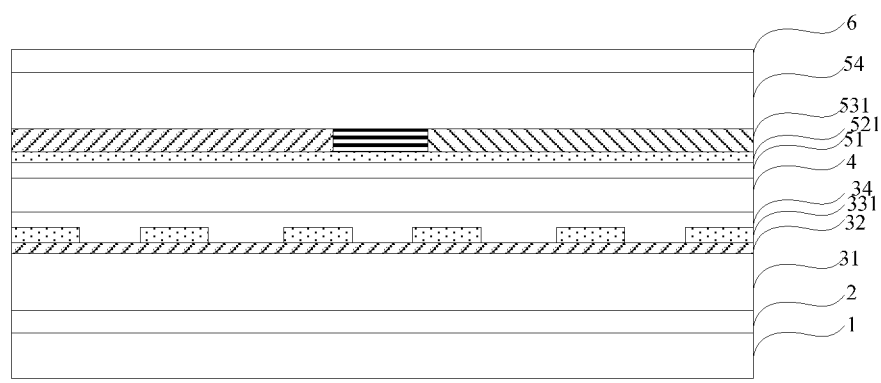

FIG. 1 and FIG. 2 are structural schematic diagrams of a liquid crystal display in the related art. In the related art, the liquid crystal display includes a backlight 1, a lower polarizer 2, a first substrate 3, a liquid crystal layer 4, a second substrate 5, and an upper polarizer 6; the first substrate 3 includes a base substrate 31 and a passivation layer 32 located on the base substrate 31, a pixel electrode 331 and an alignment layer 34. The second substrate 5 includes a base substrate 54 and a color filter unit 531 located on the base substrate 54, a common electrode 521 and an alignment layer 51. Since transmittance ratios of the lower polarizer 2, the first substrate 3, the liquid crystal layer 4, the second substrate 5, and the upper polarizer 6 are limited, which cannot reach 100%, the light emitted from the backlight 1 remains only 43% after passing through the lower polarizer 2, remains only 22%-26% left after passing through the second substrate 3, remains only 6% left after passing through the second substrate 5 and remains only 5%-5.5% left after passing through the upper polarizer 6. Finally, the transmittance ratio of the liquid crystal display can only reach about 5%, resulting in a low transmittance ratio, high energy consumption and the low energy utilization.

In view of the above issues, the liquid crystal display panel, the display device and the method of controlling a gray scale of the liquid crystal display device are provided in some embodiments of the present disclosure, to improve the transmittance ratio of the liquid crystal display device.

The liquid crystal display panel provided in some embodiments of the present disclosure includes: a first substrate, a second substrate, and a liquid crystal layer between the first substrate and the second substrate, where the second substrate is at a light-emitting side of the liquid crystal layer, the liquid crystal display panel further includes:

a first transparent electrode and a second transparent electrode, which are between the first substrate and the second substrate and arranged at two sides of the liquid crystal layer respectively, where at least one of the first transparent electrode and the second transparent electrode includes a plurality of sub-electrodes parallel to each other and each extending in a straight line, the first transparent electrode and the second transparent electrode are configured to deflect liquid crystal molecules in regions corresponding to the sub-electrodes in the liquid crystal layer to form a plurality of microprism structures in the case that a voltage is applied to the first transparent electrode and the second transparent electrode; and a refraction layer, between the crystal layer and the second substrate, where the refraction layer has a refractive index less than a refractive index of the liquid crystal layer.

According to some embodiments of the present disclosure, when the liquid crystal display panel is working, the light emitted from the backlight enters into the liquid crystal layer. The microprism structures may control the transmission of the light, so that the light may be emitted out of the liquid crystal display panel, or the light may be totally reflected at an interface between the refractive layer and the liquid crystal layer instead of being emitted out of the liquid crystal display panel, thereby realizing a gray scale display. For the thin film transistor of the liquid crystal display panel in the related art, a gray scale display is realized by controlling a state of polarized light. Instead, according to some embodiments of the present disclosure, a gray scale display may be realized without any polarizer, thereby improving a light-emitting efficiency of the liquid crystal display device.

Optionally, the refractive index of the refractive layer is not greater than 1.2. In this case, the refractive index of the liquid crystal layer is greater than the refractive index of the refractive layer, so the interface between the refractive layer and the liquid crystal layer is an interface through which an optically denser medium goes to an optically thinner medium, when the light transmits, in a predetermined direction, from the liquid crystal layer to the interface between the refractive layer and the liquid crystal layer, the light is totally reflected to the first substrate. Since an interface between the liquid crystal layer near the first substrate and the first substrate is an interface through which the optically denser medium goes to the optically thinner medium, the light is totally reflected again. As such, the light circulates in this way and cannot be emitted out of the liquid crystal display panel, thereby achieving a full black display.

Optionally, the liquid crystal display panel further includes a black matrix between the first substrate and the second substrate and arranged on at least two opposite sides of the liquid crystal layer. The black matrix may absorb light that transmits to both sides of the liquid crystal layer. Specifically, the black matrix may surround the liquid crystal layer. A cross section of the black matrix in a direction perpendicular to the first substrate is a trapezoidal cross section. Specifically, two base angles of the trapezoidal cross section range from 45° to 80°. In this case, the black matrix may also support a cell thickness of the liquid crystal cell well. In some embodiments of the present disclosure, the black matrix is arranged only at an edge of the liquid crystal layer instead of a region where the liquid crystal layer is located. Thus, a light-emitting efficiency of the liquid crystal display panel may be greatly increased. The light-emitting efficiency of the liquid crystal display panel is increased to about 30%, and the transmittance ratio is more than 70%, which is suitable for transparent display.

Optionally, the liquid crystal display panel further includes a filter layer. The filter layer is located on a side of the liquid crystal layer away from the first substrate and enabled to convert light transmitting through the liquid crystal layer and corresponding to each of the microprism structures into light having at least one color. A color display of the liquid crystal display panel may be realized by the filter layer.

Optionally, the filter layer is made of a quantum dot material. The quantum dot material is enabled to emit monochromatic light after being illuminated by the light passing through the liquid crystal layer. Compared with a color filter unit in the related art, the quantum dot material may improve the utilization of light. Because of such structure, the light-emitting efficiency of the liquid crystal display panel may be increased to more than 30%.

Optionally, the microprism structures may be a triangular prism structures and/or quadrilateral prism structures. Optionally, the microprism structures may also be other types of prism structures as long as can control the travelling of the light.

The liquid crystal display panel provided by the present disclosure will be described below in conjunction with the drawings of the embodiments.

As shown in FIGS. 3a-5, in some embodiments of the present disclosure, the liquid crystal display panel includes the first substrate and the second substrate. The first substrate includes the base substrate 31 and the passivation layer 32 on the base substrate 31. The first transparent electrode is arranged on the passivation layer 32. The first transparent electrode includes the plurality of sub-electrodes 33 that are arranged to be spaced apart from each other. The first substrate further includes the alignment layer 34 covering the sub-electrodes 33. The second substrate includes the base substrate 54 and the filter layer on the base substrate 54. Optionally, the filter layer is a quantum dot layer 56. The quantum dot layer 56 is enabled to emit the monochromatic light of different colors after being excited by light, and specifically emit red, green and blue light. The refractive layer 55 is arranged on the quantum dot layer 56. The refractive index of the refractive layer 55 is less than the refractive index of the liquid crystal layer 4. Specifically, the refractive index of the refractive layer 55 may be less than 1.2. The second transparent electrode is arranged on the refractive layer 55. The second transparent electrode is a planar electrode 52. The second substrate further includes the alignment layer 51 covering the planar electrode 52. The liquid crystal layer 4 is arranged between the alignment layer 34 and the alignment layer 51. The black matrix 7 is arranged between the first substrate and the second substrate. The black matrix 7 is located on the lateral side of the liquid crystal layer 4 and may surround the liquid crystal layer 4.

Figure 3A:
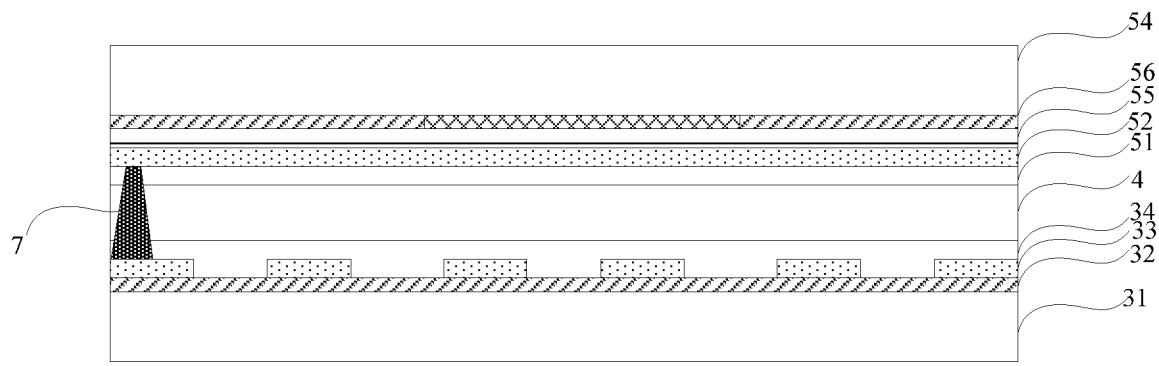
FIG. 3a is a structural schematic diagram of a liquid crystal display panel in some embodiments of the present disclosure.
Figure 3B:
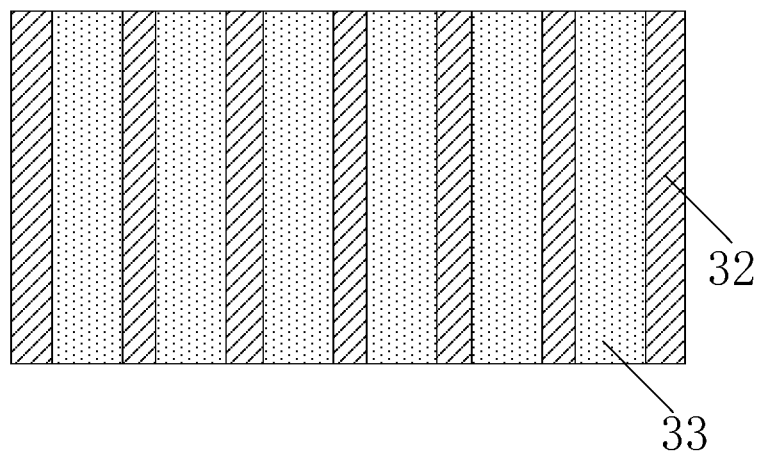

FIG. 3b is a schematic diagram of the sub-electrode 33 in some embodiments of the present disclosure. As shown in FIG. 3b, the first transparent electrode includes the plurality of sub-electrodes 33 each extending in the straight line and parallel to each other. The sub-electrodes 33 are arranged to be spaced apart from each other. It should be noted that, in order to show the structures of the sub-electrodes 33 more clearly, elements covering on the sub-electrode 33 are not shown in the top view.

Figure 4:
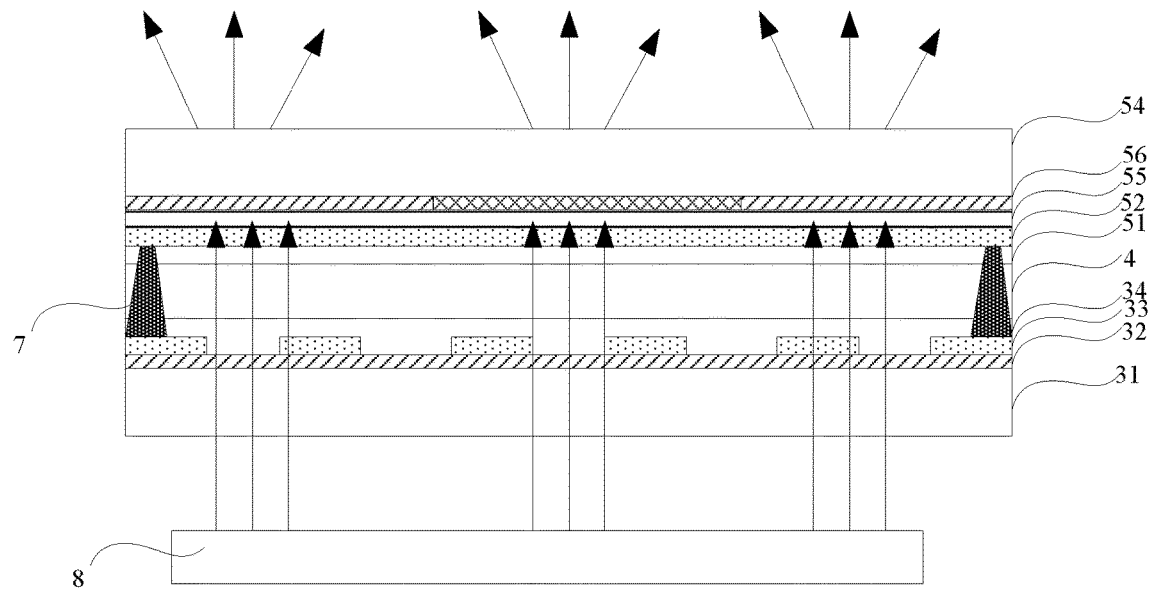
FIG. 4 is a structural schematic diagram of a liquid crystal display panel in some embodiments of the present disclosure.

In some embodiments of the present disclosure, as shown in FIG. 4, the quantum dot layer 56 is at the side of the refractive layer 55 away from the liquid crystal layer 4, and the planar electrode 52 is located at the side of the refractive layer 55 close to the liquid crystal layer 4.

Optionally, the second transparent electrode 52 includes a plurality of sub-electrodes arranged to be parallel to each other and each extending in the straight line, and the first transparent electrode is a planar electrode.

Figure 5:
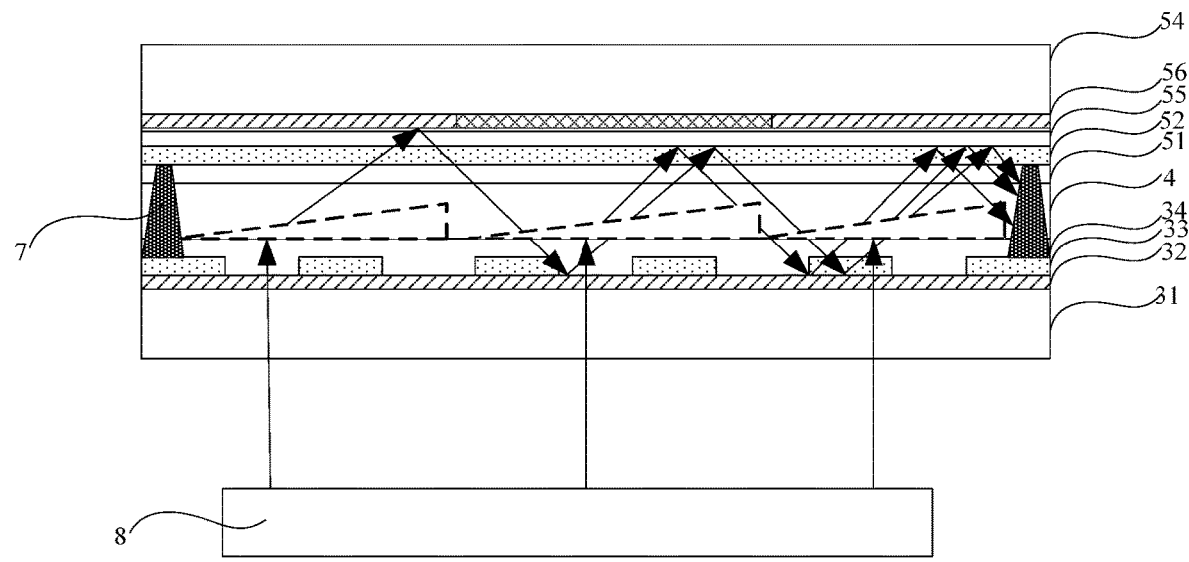
FIG. 5 is a structural schematic diagram of a liquid crystal display panel in some embodiments of the present disclosure.

As shown in FIG. 4, in the case that the gray scale displayed on the liquid crystal display panel is 255, no voltage is applied to the sub-electrode 33 and the planar electrode 52. The light entering into the liquid crystal display panel from the backlight 8 is emitted onto the quantum dot layer 56. The quantum dot layer 56 is enabled to emit the monochromatic light of different colors after being excited by light, thereby realizing a color display. At this time, the gray scale displayed on the liquid crystal display panel is 255. As shown in FIG. 5, in the case that the liquid crystal display panel is not in a state of the gray scale display, that is, the gray scale is 0, an appropriate voltage is applied to the sub-electrodes 33 and the planar electrode 52 to form a liquid crystal prism. At this time, the light entering into the liquid crystal display panel from the backlight is refracted to the second substrate. Since the refractive index of the liquid crystal layer 4 is greater than the refractive index of the refractive layer 55, an interface through which an optically denser medium goes to an optically thinner medium is formed, the light is totally reflected to the first substrate. Since the interface between the liquid crystal layer near the first substrate and the first substrate is an interface through which the optically denser medium goes to the optically thinner medium (at this time, the liquid crystal is horizontally oriented), the light is totally reflected again. The light circulates until reaching the edge of the liquid crystal display panel being absorbed by the black matrix 7. At this time, no light is emitted from the liquid crystal display panel. In a middle gray scale, by adjusting the voltage applied to the sub-electrodes 33 and the planar electrode 52, the light is refracted by the liquid crystal molecules of the regions in different degrees, so as to control the energy of the emitted light to control the gray scale.

In some embodiments of the present disclosure, as shown in FIG. 4 and FIG. 5, an orthographic projection of the black matrix 7 onto the base substrate 31 overlaps with an orthographic projection of the sub-electrodes at the edge region of the liquid crystal display panel onto the base substrate 31.

A liquid crystal display device provided by the present disclosure including the liquid crystal display panel as described above, further includes the backlight, in which the backlight is located on a light-entering side of the liquid crystal display panel, and the light emitted by the backlight is collimated light or parallel light. The display device may be any product or component having a display function, such as a liquid crystal television, a liquid crystal display, a digital photo frame, a mobile phone, a tablet computer, or the like. The display device also includes a flexible circuit board, a printed circuit board and a backplane.

According to some embodiments of the present disclosure, when the liquid crystal display panel is working, the light emitted from the backlight enters into the liquid crystal layer. The microprism structures may control the transmission of the light, so that the light may be emitted out of the liquid crystal display panel, or the light may be totally reflected at an interface between the refractive layer and the liquid crystal layer instead of being emitted out of the liquid crystal display panel, thereby realizing a gray scale display. For the thin film transistor of the liquid crystal display panel in the related art, a gray scale display is realized by controlling a state of polarized light. Instead, according to some embodiments of the present disclosure, a gray scale display may be realized without any polarizer, thereby improving a light-emitting efficiency of the liquid crystal display device.

The black matrix is not arranged in a region corresponding to the liquid crystal layer, thereby greatly improving the light-emitting efficiency of the liquid crystal display panel. Specifically, the light-emitting efficiency of the liquid crystal display panel is increased to more than 30%, and the transparency of the liquid crystal display panel is increased to more than 70%, which may be suitable for a transparent display.

A method of controlling a gray scale of a liquid crystal display device is provided in some embodiments of the present disclosure, applied to the liquid crystal display device as described above and including:

applying a voltage to the first transparent electrode and the second transparent electrode according to image data, in the case that the liquid crystal display device displays, to deflect the liquid crystal molecules in the regions corresponding to the sub-electrodes in the liquid crystal layer to form the microprism structures; controlling the microprism structures by adjusting the voltage applied to the sub-electrodes, to control a distribution ratio of emitting light of the backlight being refracted through the microprism structures within a predetermined viewing angle range.

According to some embodiments of the present disclosure, when the liquid crystal display panel is working, the light emitted from the backlight enters into the liquid crystal layer. The microprism structures may control the transmission of the light, so that the light may be emitted out of the liquid crystal display panel, or the light may be totally reflected at an interface between the refractive layer and the liquid crystal layer instead of being emitted out of the liquid crystal display panel, thereby realizing a gray scale display. For the thin film transistor of the liquid crystal display panel in the related art, a gray scale display is realized by controlling a state of polarized light. Instead, according to some embodiments of the present disclosure, a gray scale display may be realized without any polarizer, thereby improving a light-emitting efficiency of the liquid crystal display device.

As shown in FIGS. 3a-5, in some embodiments of the present disclosure, the liquid crystal display panel includes the first substrate and the second substrate. The first substrate includes the base substrate 31 and the passivation layer 32 on the base substrate 31. The first transparent electrode is arranged on the passivation layer 32. The first transparent electrode includes the plurality of sub-electrodes 33 that are arranged to be spaced apart from each other. The first substrate further includes the alignment layer 34 covering the sub-electrodes 33. The second substrate includes the base substrate 54 and the quantum dot layer 56 on the base substrate 54. The quantum dot layer 56 is enabled to emit the monochromatic light of different colors after being excited by light, and specifically emit red, green and blue light. The refractive layer 55 is arranged on the quantum dot layer 56. The refractive index of the refractive layer 55 is less than the refractive index of the liquid crystal layer 4. Specifically, the refractive index of the refractive layer 55 may be less than 1.2. The second transparent electrode is arranged on the refractive layer 55. The second transparent electrode is a planar electrode 52. The second substrate further includes the alignment layer 51 covering the planar electrode 52. The liquid crystal layer 4 is arranged between the alignment layer 34 and the alignment layer 51. The black matrix 7 is arranged between the first substrate and the second substrate. The black matrix 7 is located on the side of the liquid crystal layer 4 and may surround the liquid crystal layer 4.

As shown in FIG. 4, in the case that the gray scale displayed on the liquid crystal display panel is 255, no voltage is applied to the sub-electrode 33 and the planar electrode 52. The light entering into the liquid crystal display panel from the backlight 8 is emitted onto the quantum dot layer 56. The quantum dot layer 56 is enabled to emit the monochromatic light of different colors after being excited by light, thereby realizing a color display. At this time, the gray scale displayed on the liquid crystal display panel is 255. As shown in FIG. 5, in the case that the liquid crystal display panel is not in a state of the gray scale display, that is, the gray scale is 0, an appropriate voltage is applied to the sub-electrodes 33 and the planar electrode 52 to form a liquid crystal prism. At this time, the light entering into the liquid crystal display panel of the backlight is refracted to the second substrate. Since the refractive index of the liquid crystal layer 4 is greater than the refractive index of the refractive layer 55 to form the interface which is from an optically denser medium to an optically thinner medium, the light is totally reflected to the first substrate. Since the interface between the liquid crystal layer near the first substrate and the first substrate is an interface through which the optically denser medium goes to the optically thinner medium (at this time, the liquid crystal is horizontally oriented), the light is totally reflected again. The light circulates until reaching the edge of the liquid crystal display panel and being absorbed by the black matrix 7. At this time, no light is emitted from the liquid crystal display panel. In a middle gray scale, by adjusting the voltage applied to the sub-electrodes 33 and the planar electrode 52, the light is refracted by the liquid crystal molecules of the regions in different degrees, so as to control the energy of the emitted light to control a gray scale.

Unless otherwise defined, technical terms or scientific terms used in the present disclosure should be interpreted according to common meanings thereof as commonly understood by those of ordinary skills in the art. Such terms as "first", "second" and the like used in the present disclosure do not represent any order, quantity or importance, but are merely used to distinguish different components. Such terms as "including", or "comprising" and the like mean that an element or an article preceding the term contains elements or items and equivalents thereof behind the term, but does not exclude other elements or items. Such terms as "connect", or "interconnected" and the like are not limited to physical or mechanical connections, but may include electrical connections, whether direct connection or indirect connection. Such terms as "on", "under", "left", "right" and the like are only used to represent a relative position relationship, and when an absolute position of a described object is changed, the relative position relationship thereof may also be changed accordingly.

It may be understood that when an element such as a layer, a film, a region or a substrate is referred to as being "on" or "under" another element, the element may be "directly" "on" or "under" the another element, or there may exist an intervening element.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A liquid crystal display panel, comprising:
   a first substrate;
   a second substrate; and
   a liquid crystal layer between the first substrate and the second substrate,
   wherein the second substrate is at a light-emitting side of the liquid crystal layer;
   wherein the liquid crystal display panel further comprises:
   a first transparent electrode and a second transparent electrode, which are between the first substrate and the second substrate and arranged at two sides of the liquid crystal layer respectively, wherein the first transparent electrode and the second transparent electrode are configured to deflect liquid crystal molecules in regions corresponding to sub-electrodes in the liquid crystal layer to form a plurality of microprism structures in the case that a voltage is applied to the first transparent electrode and the second transparent electrode;

a refraction layer between the crystal layer and the second substrate, wherein the refraction layer has a refractive index less than a refractive index of the liquid crystal layer; and a filter layer at a side of the liquid crystal layer away from the first transparent electrode;

wherein the first transparent electrode comprises a plurality of sub-electrodes parallel to each other and extending in straight lines, and wherein the filter layer is configured to convert light transmitted through the liquid crystal layer and corresponding to each of the microprism structures into light having at least one color.

2. The liquid crystal display panel according to claim 1, further comprising:

a black matrix between the first substrate and the second substrate, at an edge of the liquid crystal display panel and surrounding the liquid crystal layer.

3. The liquid crystal display panel according to claim 2, wherein a cross section of the black matrix in a direction perpendicular to the first substrate is a trapezoidal cross section.

4. The liquid crystal display panel according to claim 3, wherein two base angles of the trapezoidal cross section range from 45° to 80°.

5. The liquid crystal display panel according to claim 2, wherein an orthographic projection of the black matrix onto the first substrate overlaps with an orthographic projection of the sub-electrodes at the edge of the liquid crystal display panel onto the first substrate.

6. The liquid crystal display panel according to claim 1, wherein the refractive index of the refractive layer is less than 1.2.

7. The liquid crystal display panel according to claim 1, wherein the filter layer is made of a quantum dot material.

8. The liquid crystal display panel according to claim 1, wherein the microprism structures comprise a plurality of triangular prism structures and/or quadrilateral prism structures.

9. The liquid crystal display panel according to claim 1, wherein the filter layer is at a side of the refractive layer away from the liquid crystal layer, and the second transparent electrode is at a side of the refractive layer close to the liquid crystal layer.

10. The liquid crystal display panel according to claim 1, wherein the first transparent electrode comprises the sub-electrodes parallel to each other and extending in the straight lines, and the second transparent electrode is a planar electrode.

11. The liquid crystal display panel according to claim 1, wherein the second transparent electrode comprises the sub-electrodes parallel to each other and extending in the straight lines, and the first transparent electrode is a planar electrode.

12. A liquid crystal display device comprising the liquid crystal display panel according to claim 1, and further comprising:

a backlight at a light-entering side of the liquid crystal display panel and configured to emit collimated light or parallel light.

13. A method of controlling a gray scale of a liquid crystal display device, applied to the liquid crystal display device according to claim 12, comprising:

applying a voltage to the first transparent electrode and the second transparent electrode according to image data, in the case that the liquid crystal display device displays, to deflect the liquid crystal molecules in the regions corresponding to the sub-electrodes in the liquid crystal layer to form the microprism structures;

controlling the microprism structures by adjusting the voltage applied to the sub-electrodes, to control a distribution ratio of emitting light of the backlight being refracted through the microprism structures within a predetermined viewing angle range.

* * * * *